United States Patent
Ahluwalia et al.

(10) Patent No.: US 9,047,594 B2
(45) Date of Patent: Jun. 2, 2015

(54) SMART PHONE SYSTEM AND METHOD

(75) Inventors: Aruj Ahluwalia, Jersey City, NJ (US); Vernon Marshall, Montclair, NJ (US); Satish Thenthiruperai Narayanan, Phoenix, AZ (US); Andrew Roth, Scarsdale, NY (US); Xiongwen Rui, Scottsdale, AZ (US); Thomas K. Serge, Glendale, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 493 days.

(21) Appl. No.: 13/406,226

(22) Filed: Feb. 27, 2012

(65) Prior Publication Data

US 2013/0226720 A1 Aug. 29, 2013

Related U.S. Application Data

(63) Continuation of application No. 13/406,197, filed on Feb. 27, 2012.

(51) Int. Cl.
| | |
|---|---|
| *G06Q 20/20* | (2012.01) |
| *G06Q 20/32* | (2012.01) |
| *G06Q 20/34* | (2012.01) |
| *G06Q 20/38* | (2012.01) |
| *G06Q 20/40* | (2012.01) |
| *G06Q 20/42* | (2012.01) |

(52) U.S. Cl.
CPC ............ *G06Q 20/20* (2013.01); *G06Q 20/3227* (2013.01); *G06Q 20/325* (2013.01); *G06Q 20/34* (2013.01); *G06Q 20/385* (2013.01); *G06Q 20/4012* (2013.01); *G06Q 20/40145* (2013.01); *G06Q 20/4016* (2013.01); *G06Q 20/425* (2013.01); *G06Q 20/3821* (2013.01)

(58) Field of Classification Search
USPC .............. 705/16, 17, 18, 26.1, 27.1, 2, 26.35; 235/376, 383, 380
See application file for complete search history.

(56) References Cited

U.S. PATENT DOCUMENTS

| | | | |
|---|---|---|---|
| 5,628,051 A | 5/1997 | Salin | |
| 5,679,940 A * | 10/1997 | Templeton et al. | ........... 235/380 |
| 6,539,435 B2 | 3/2003 | Bolmarcich et al. | |
| 6,757,710 B2 | 6/2004 | Reed | |
| 6,870,833 B2 * | 3/2005 | Schwartz | ...................... 370/353 |
| 6,871,185 B2 | 3/2005 | Walker et al. | |
| 6,907,463 B1 | 6/2005 | Kleinpeter, III et al. | |
| 7,181,017 B1 * | 2/2007 | Nagel et al. | ................... 380/282 |
| 7,232,063 B2 | 6/2007 | Fandel et al. | |
| 7,635,083 B2 | 12/2009 | Fukuda et al. | |
| 8,041,338 B2 | 10/2011 | Chen et al. | |
| 8,126,480 B2 | 2/2012 | Morrison | |
| 8,204,032 B2 * | 6/2012 | Gao et al. | ...................... 370/346 |
| 8,291,011 B2 | 10/2012 | Abu-Hakima et al. | |

(Continued)

OTHER PUBLICATIONS

Office Action dated Feb. 4, 2014 in U.S. Appl. No. 13/406,197.

(Continued)

*Primary Examiner* — Andrew J Rudy
(74) *Attorney, Agent, or Firm* — Snell & Wilmer L.L.P.

(57) ABSTRACT

A system and method for remediation, curing concerns, and transferring information associated with declined transactions is disclosed. The present disclosure generally relates to electronic commerce, and more particularly, to a system and method of validation and efficiency associated with electronic commerce.

20 Claims, 7 Drawing Sheets

(56) References Cited

U.S. PATENT DOCUMENTS

| | | |
|---|---|---|
| 8,306,967 B2 | 11/2012 | Gakitsky et al. |
| 8,326,759 B2 | 12/2012 | Hammad |
| 8,370,265 B2 | 2/2013 | Coulter et al. |
| 8,417,644 B2 | 4/2013 | Ferguson et al. |
| 8,423,048 B2 | 4/2013 | Morrison |
| 8,495,424 B1 | 7/2013 | Vannatter et al. |
| 8,509,734 B1 | 8/2013 | Gupta et al. |
| 8,538,827 B1 | 9/2013 | Dryer et al. |
| 8,606,638 B2 | 12/2013 | Dragt |
| 8,626,592 B2 | 1/2014 | Simakov et al. |
| 8,631,231 B2 | 1/2014 | Wentker et al. |
| 8,706,556 B2 | 4/2014 | Mestre et al. |
| 8,712,857 B1 * | 4/2014 | Adornato et al. ............ 705/26.8 |
| 8,781,963 B1 | 7/2014 | Feng et al. |
| 2005/0138081 A1 * | 6/2005 | Alshab et al. ................ 707/200 |
| 2010/0023343 A1 * | 1/2010 | Coleman et al. ................ 705/2 |
| 2012/0190386 A1 | 7/2012 | Anderson |
| 2013/0267272 A1 * | 10/2013 | Yang et al. ................ 455/552.1 |

OTHER PUBLICATIONS

Office Action Restriction dated Oct. 25, 2013 in U.S. Appl. No. 13/406,197.

Office Action dated Aug. 13, 2014 in U.S. Appl. No. 13/406,197.

\* cited by examiner

SMART PHONE SYSTEM AND METHOD

CROSS-REFERENCE TO RELATED APPLICATION

This application is a continuation of, and claims priority to, U.S. Ser. No. 13/406,197 entitled "SMART PHONE SYSTEM AND METHOD" filed on Feb. 27, 2012, which is incorporated herein in its entirety.

FIELD OF DISCLOSURE

The present disclosure generally relates to electronic commerce, and more particularly, to a system and method of validation and efficiency associated with electronic commerce.

BACKGROUND OF THE DISCLOSURE

Credit cards, charge cards, and other transaction instruments are commonly accepted today as a form of payment under a variety of circumstances. A transaction instrument may be used to complete a purchase in-person (e.g., at a retail store, a restaurant, or a hotel) by physically presenting a merchant with the transaction instrument. A transaction instrument may also be used to complete a purchase without physically presenting the transaction instrument by relaying information associated with the transaction instrument (e.g., account number, account name, expiration date, and billing address) to a merchant, such as though a point of sale (IPOS) device. Examples of merchants that accept transaction account information as payment, without physically receiving the transaction instrument include Internet, telephone and mail order merchants.

At times, the above commerce experience may be interrupted for various reasons. The Consumer, Merchants and Financial Institutions have been limited in the tools available for resolving these interruptions. Given the foregoing, a strong need exists for a system, method and computer readable medium that may be used to quickly resolve the interruption and assist with facilitating a transaction.

SUMMARY OF THE DISCLOSURE

The present disclosure includes an application to resolve a point of sale decline in real time. A system, method and instructions stored to a computer readable medium for curing a declined transaction authorization request is presented.

In various embodiments, a method for curing a declined transaction includes receiving a passively pushed message via an application in response to (and substantially in concert with) a declined transaction request via a merchant point of sale system. This method further includes selecting an option presented in the passive pushed message, and receiving a response to the selection of the option. The response may instruct the transaction account holder to retry the transaction or present a one click option to open a communication session between the transaction account holder and the transaction account issuer. This method may include downloading, installing and logging into a computer based application via a mobile device. A unique device ID may be associated with the mobile device of the transaction account holder by the transaction account issuer based on an indicator (e.g., the digital fingerprint) of the mobile device. The transaction may be authorized based on both the response by the transaction account holder to the received message indicating that the transaction is authorized and the digital fingerprint of a responding mobile device matching a stored digital fingerprint of the mobile device associated with the transaction account holder.

The passively pushed message may be received by a mobile device. The point of sale system may be a virtual or physical point of sale system. The passively pushed message may present options, such as authorizing a suspected fraudulent transaction, providing payment on the transaction account, and/or initiating a one click communication session. The method may include entering data to initiate a secure log-on to the application. The transaction may be authorized in response to the transaction account holder retrying the transaction. The method may include directly contacting a customer service representative via the mobile device in response to selection of the option to open a one click communication session. A user selected response may be communicated to a processing system which may result in the transaction being authorized in response to criteria being met. The criteria may include the transaction account holder authorizing a suspected fraudulent transaction and/or a mobile device ID matching a stored mobile device ID associated with the transaction account holder.

The transaction may be initiated via a mobile device of the transaction account holder. The transaction may be authorized based on a transaction processor receiving a communication indicating that the transaction account holder submitted a valid payment via the computer based application in response to the option presented in the passive pushed message. The transaction account holder may transmit secure log-on information to receive financial transaction account information and make a payment to the transaction account. The passively pushed message may include a calculated minimum amount and information particular to the instant transaction to cure the declined transaction.

BRIEF DESCRIPTION OF THE DRAWINGS

A more complete understanding may be derived by referring to the detailed description and claims when considered in connection with the Figures, wherein like reference numbers refer to similar elements throughout the Figures, and:

DETAILED DESCRIPTION

The detailed description of various embodiments herein makes reference to the accompanying drawings and pictures, which show the various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments", "one embodiment", "other embodiments", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with various embodiments, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in alternative embodiments.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

Figure 1:
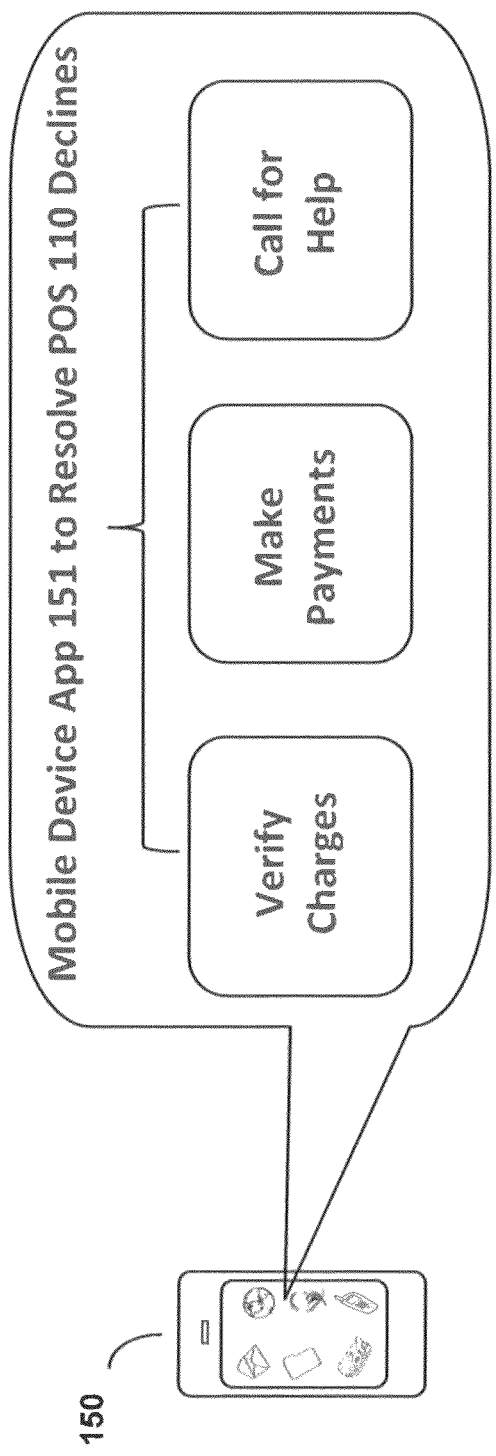
FIG. 1 depicts a tool for resolving point of sale transaction request declines in accordance with various embodiments.
Figure 2:
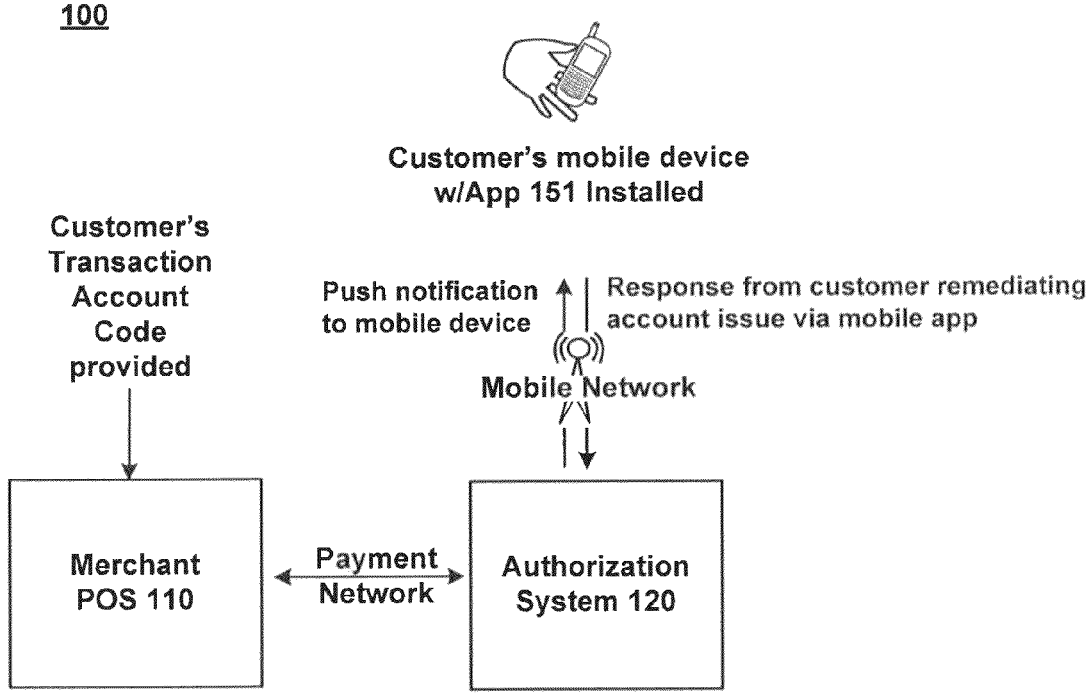
FIG. 2 is a block diagram illustrating a method for resolving a point of sale decline in accordance with various embodiments.

In various embodiments, with reference to FIGS. 1 and 2, a system for resolving POS 110 declines 100 may comprise a tool 150, such as a computer application for resolving a point of sale transaction decline. This tool 150 for resolving a point of sale transaction decline may take the form of application software. Application software, also known as an application or an "app", is computer software designed to help the user to perform specific tasks. This application software may be a mobile application, also called mobile app, usually designed to run on smart phones and tablet computers; however, according to various embodiments, this mobile app may be run on any computer based system.

In various embodiments, with renewed reference to FIG. 1, the system for resolving POS declines 100 may further comprise a merchant POS 110 system for accepting transaction account code information. System 100 may further comprise an authorization system 120 for processing the transaction. In various embodiments, this authorization system 120 may be managed by the transaction account issuer.

For instance, a consumer (e.g. a transaction account holder or their designee) may interact with merchant in person (e.g., at the box office), telephonically, or electronically (e.g., from a user computer via a network such as the Internet or via a mobile device) to initiate and complete a transaction and/or purchase (e.g. transmit a transaction request). When interacting in person, the consumer may physically present a transaction instrument to the merchant as a form of payment. When communicating with the merchant through a telephone or a computer (e.g., using a web enabled computer, mobile device, point of sale device, kiosk, terminal or the like), the consumer may provide information associated with a transaction account (e.g., transaction account number or code, expiration date, account name, and billing address) to the merchant to complete and facilitate the transaction. As used herein, a consumer or transaction account holder may include the holder of the account, a supplemental account holder, anyone associated with the account, a beneficiary of the account, a designee of the account and the like.

From time to time, these transaction requests are declined for various reasons. Using the present system 100, the decline may be overcome with various remedial actions and/or the reason for the decline may be understood with greater clarity. A non-exhaustive list of reasons a transaction request may be declined comprise: suspected fraud, confirmed fraud, insufficient funds, holds placed on accounts, accounts in arrears, previous cancellation of an account, out of pattern spending, past due account, over limit account, and due to transaction account holder preferences.

Upon receipt of a transaction request, the merchant and/or merchant POS system 110 may submit a transaction authorization request to an authorization system and/or payment system to accept the transaction code. This submitted request may be via a gateway service. The transaction authorization request is transmitted to the payment system and/or authorization system 120. These authorization requests may be sent to the authorization system 120 and/or transaction account issuer over, for example, any network, intranet, the Internet, wireless communications, application program interface (API) and/or the like.

The merchant may also send a fraud assessment and/or request for verification services (described in further detail below) associated with captured and/or provided entity information, transaction instrument data, and payment information. Examples of this data include, for example, an email address, a contact telephone number, a ship-to-name, a ship-to-address, customer hostname, HTTP browser type, ship to country, shipping method, product SKU, number of cities, consumer trends, an IP address, a seller identification, and/or descriptors of goods or services associated with the transaction.

Additionally, a fraud assessment and/or verification system may be enacted and/or requested by the authorization system 120, transaction account issuer, and/or a third party system. Data such as historical data, purchase history, purchase velocity, country code of purchase, an email address, a contact telephone number, a ship-to-name, a ship-to-address, customer hostname, HTTP browser type, ship to country, shipping method, product SKU, number of cities, consumer trends, an IP address, security alerts placed on an account, seller identification, and/or descriptors of goods or services associated with the transaction.

The fraud assessment and/or request for verification services may be sent and/or enacted in association with a transaction authorization request (e.g., parallel with a transaction authorization request, after a transaction authorization request, in response to sending a transaction request, and/or in response to receiving a transaction request).

In various embodiments, a request for fraud services may include transmitting enhanced authorization data and/or utilizing fraud tools. Examples of services, data and tools include as disclosed in U.S. patent application Ser. No. 11/303,018, entitled "System, Method And Computer Program Product For Authorizing Transactions Using Enhanced Authorization Data," filed Dec. 16, 2005; U.S. patent application Ser. No. 10/588,811, entitled "System And Method Using Enhanced Authorization Data To Reduce Travel Related Transaction Fraud," filed Jun. 11, 2007; U.S. patent application Ser. No. 12/205,412, entitled "Method, System, And Computer Program Product For Customer-Level Data Verification," filed Sep. 5, 2008; U.S. patent application Ser. No. 12/874,063, entitled "Application Program Interface Based Fraud Mitigation," filed Sep. 1, 2010; and U.S. patent application Ser. No. 12/948,629, "Internet Facilitation of Fraud Services" filed Nov. 17, 2010; the contents of all documents are hereby incorporated by reference for any purpose in their entirety.

The result of the fraud assessment may be to transmit a notice to the merchant, via the PAS system 120 to decline the transaction. Historically, a consumer might not be able to overcome this decline without seeking out and contacting their transaction account issuer. In this case a transaction account holder may be embarrassed and attempt to process the transaction using a different transaction account. In most instances, resolving the issue requires the user to determine and locate the appropriate contact information well after time to consummate the transaction has passed. The present system 100 is configured to overcome these and other problems associated with a declined transaction substantially simultaneously with the declined transaction.

Figure 3:
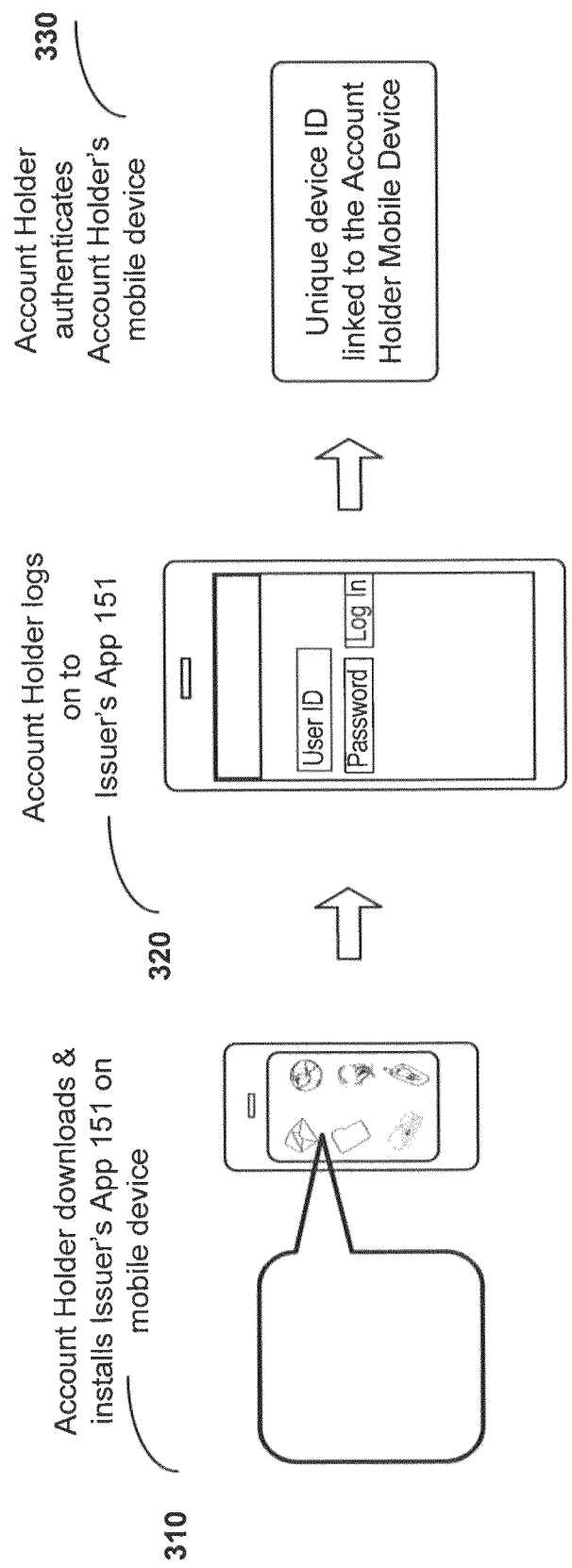
FIG. 3 is a flow chart depicting an exemplary computer based installation and registration system for implementing various embodiments.

In various embodiments, and with reference to FIG. 3, a transaction account holder may join the system 100. Joining the system 100 may take any suitable form. For instance, joining the system 100 may occur as part of the transaction account application process, as an active step initiated by the transaction account holder, and/or initiated by the transaction account issuer in response to a condition. The condition may be that the transaction account holder is associated with an active transaction account, or that the transaction account holder has previously downloaded an application, or that the transaction account holder meets pre-selected criteria.

In various embodiments, with reference to FIG. 3, a transaction account holder may download and install the tool 150 for resolving a point of sale 110 transaction decline, such as app 151 (310) via and/or on a mobile device, such as a smart phone or tablet. This app 151 may be part of a larger application suite providing additional services or may be a stand alone module/app. The transaction account holder may then log onto app 151 via the mobile device. This log on may be accomplished using previously established data such as internal data, and/or data used for electronically logging into a user's account via the internet or via another related mobile app. Associated with this log on may be an identification process and association process. The transaction account holder may enter their transaction account code, and/or pass code (320). This pass code may be previously stored and/or communicated to the user through secure channels. The issuer may assign a unique device ID linked to the mobile device of the transaction account holder (330). The unique ID may be based on and associated with the hardware characteristics and/or electronic fingerprint of the mobile device.

Figure 4:
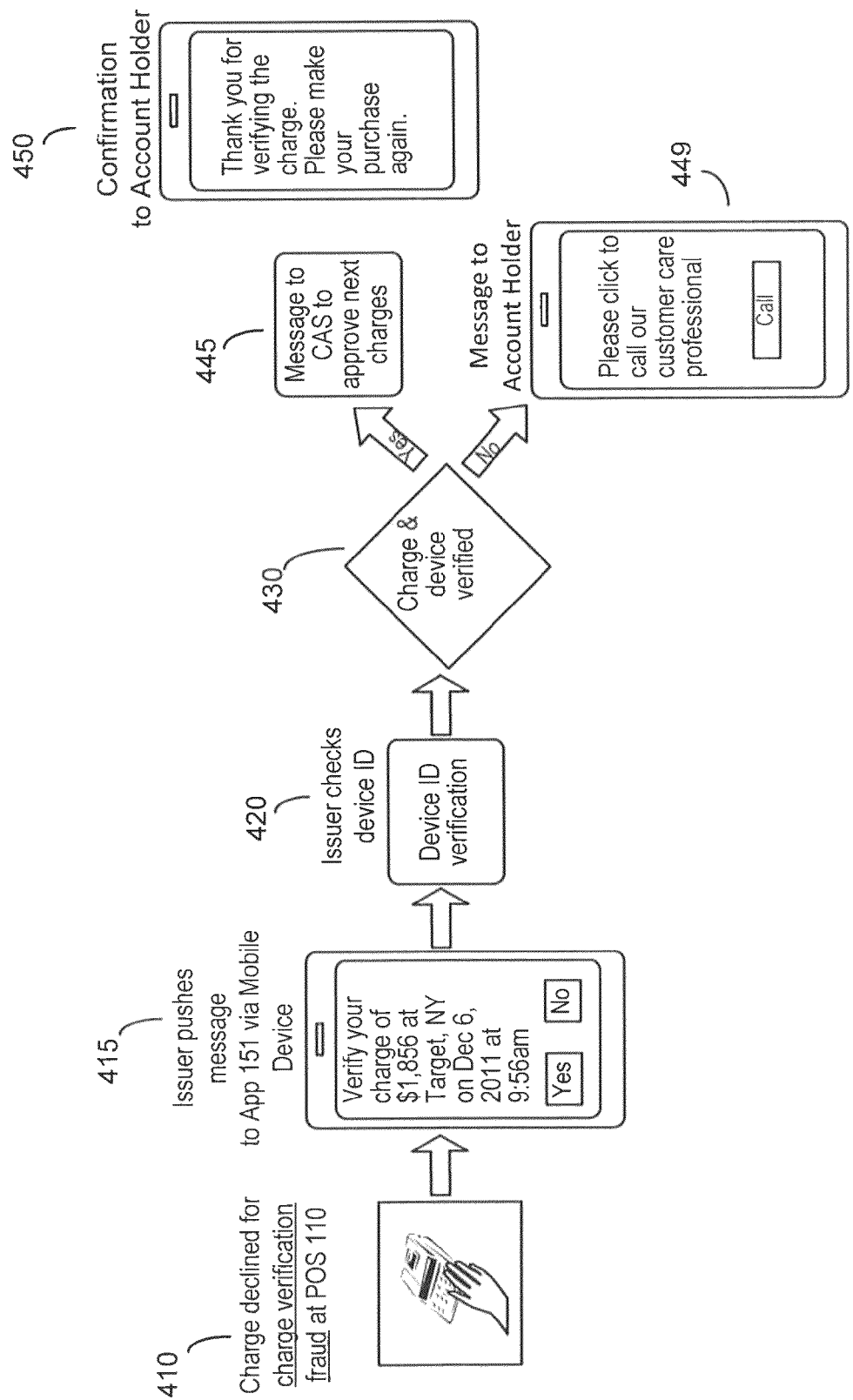
FIG. 4 is a flow chart depicting a system for resolving a point of sale suspected fraud decline in accordance with various embodiments.

In various embodiments, with reference to FIG. 4, a POS 110 transaction is declined. In various embodiments, the transaction is declined due to suspected fraud (410). In response to the suspected fraud and/or declined transaction, a message is passively pushed to the mobile device app 151 (415). Stated another way, the message is passively transmitted to the mobile device in response to the declined transaction. In various embodiments, the user does not actively enter information describing details of the transaction into and/or via app 151. App 151 is populated with the transaction information and displays a message on the mobile device. In various embodiments, the system 100 is configured so the transaction account holder merely reads the message and selects/triggers presented options via virtual button(s), such as selecting "yes" or selecting "no" (430). The issuer system verifies the hardware characteristics, electronic fingerprint and/or unique device ID associated with the mobile device in response to the selected/triggered option (420). In response to at least one of the mobile device ID matching the stored mobile device ID and the transaction account holder verifying that they do wish for the transaction to occur, a message is transmitted to the transaction processor to approve subsequent transactions for a pre-selected period time (445). In various embodiments, if the mobile device ID does not match the stored mobile device ID, the user may be prompted to provide additional verification information, such as a log-on and password. In response to the transaction processor receiving the message to approve subsequent transactions for a pre-selected period of time, a message may be pushed to the app 151 requesting that the transaction account holder attempt the purchase again (450). The pre-selected period of time may be any suitable period of time, such as an hour, a day, a week, a period of weeks and/or the like. A record of the initial transaction decline and the reply to the message selected by the app 151 user may be stored for later retrieval, such as when a charge is disputed.

In response to at least one of the mobile device ID or the transaction account holder not authorizing the transaction, a message with further instructions may be presented to the transaction account holder via app 151 (449). The message with further instructions may comprise a message stating "please click to call our customer care professionals" with a trigger-able "call" virtual button option. In response to triggering/selecting the "call" option, the mobile device may automatically place a mobile device call to a support number to assist with the transaction accountholder's needs. In this embodiment, a transaction account holder need only touch two buttons to be placed in contact with support. Namely, these two buttons are "no" indicating that the charge is not approved and "call" to be placed in contact with customer support. Additionally, an option to begin an electronic messaging session or send electronic correspondence also be available or alternatively available. In various embodiments, frequently asked question (FAQ) information may be presented to the transaction account holder via the mobile device app 151. In various embodiments, further information, such as the steps needed to resolve the issue are presented to the user via app 151 or through secondary communication channels.

In various embodiments, a message that a POS 110 transaction which may need to be declined due to suspected fraud (not depicted) is sent to transaction issuer system. In response to the message that a transaction may need to be declined, a message is pushed to the mobile device app 151. App 151 is populated with the transaction information and displays a message on the mobile device. In various embodiments, the system 100 is configured so the transaction account holder merely reads the message and selects/triggers, such as selecting "yes" or selecting "no", to a presented option. The issuer system verifies the unique device ID associated with the mobile device responding to the presented option. In response to both the mobile device ID and the transaction account holder verifying and indicating through selection that they do wish for the transaction to occur, a message is transmitted to the transaction processor to approve the transaction flagged as potentially needing to be declined. In response to the transaction processor receiving the message to approve the transaction the transaction processor processes the transaction. Should a reply to the message, not be returned within a predetermined period, the transaction is declined. In response to the transaction processor receiving the message rejecting (not approve) the transaction the transaction processor declines the transaction. In various embodiments, the transaction holder may not need to initiate the transaction a second time.

Figure 5:
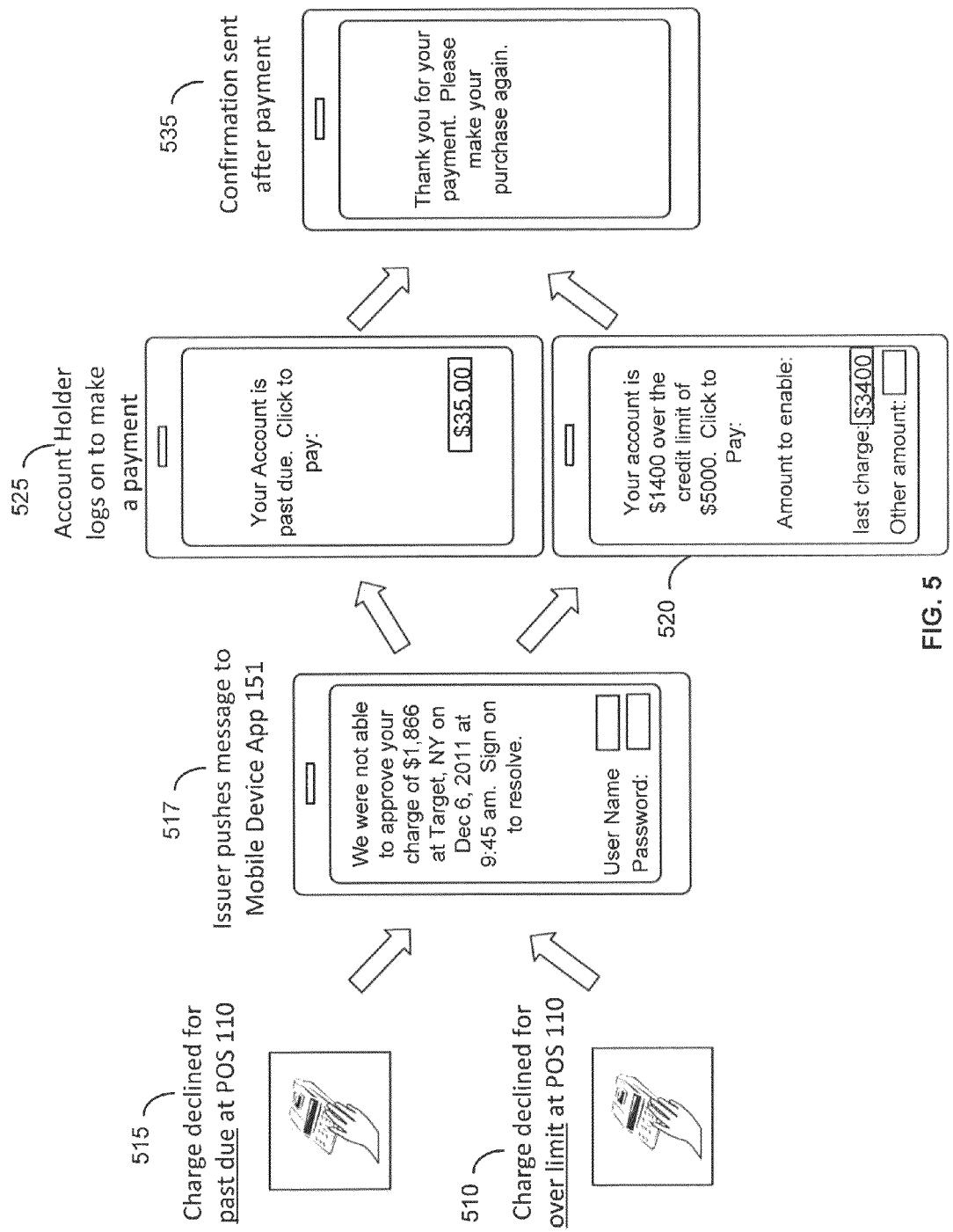
FIG. 5 is a flow chart depicting a point of sale account management decline resolve tool in accordance with various embodiments.

With reference to FIG. 5, a POS 110 transaction is declined. In various embodiments, the transaction is declined due to the presented transaction account having a status of "past due" (515). In response to the status being identified as "past due" a message is pushed to the mobile device app 151 (517). In various embodiments, the user does not actively enter information describing details of the transaction into app 151. App 151 is populated with the transaction information and displays a message on the mobile device. In various embodiments, the system 100 is configured so the transaction account holder is presented with information describing the nature of the decline. In various embodiments, the transaction account holder may be presented with information describing the nature of the decline and presented with an option to rectify the problem. For instance, as depicted in FIG. 5, the mobile device may indicate that a particular charge was declined and request that the transaction account holder securely sign in. In response to the transaction account holder securely signing in, a message describing that the transaction account holder is past due is displayed on the mobile device via app 151. The transaction account holder may enter information and/or make a selection to change the account status from "past due." For instance, a transaction account holder may enter a payment amount (from a previously established internal data such as a payment source) into a field or through selection of presented options in app 151. This payment amount may be a minimum payment, the entire amount past due or another desired amount (preferably above the minimum) (525). In response to the payment amount being selected/entered and the transfer being confirmed from the funding source, a message is populated on app 151 requesting that the transaction be retried (535).

With reference again to FIG. 5 (a POS 110 transaction is declined), in various embodiments, the transaction is declined due to the presented transaction account having a status of "over limit" (510). In response to the status being identified as "over limit" a message is pushed to mobile device app 151 (517). In various embodiments, the user does not actively enter information describing details of the transaction into app 151. App 151 is populated with the transaction information (by the transaction processor 120) and displays a message on the mobile device. In various embodiments, the system 100 is configured so the transaction account holder is presented with information describing the nature of the decline. In various embodiments, the transaction account holder is presented with information describing the nature of the decline and presented with an option to rectify the problem. For instance, as depicted in FIG. 5, the mobile device may indicate that a particular charge was declined and request that the transaction account holder securely sign in. In response to the transaction account holder securely signing in, a message describing that the transaction account holder is over their limit is presented on the mobile device via app 151. The transaction account holder may enter information and/or make a selection to change the account status from "over limit." For instance, a transaction account holder may enter a payment amount (from a previously established payment source) into a field or through selection of presented options in app 151. This payment amount may be a minimum payment, such as the amount needed for the instant transaction to be processed (as calculated by app 151), the current balance, or another desired amount (preferably above the minimum to enable the processing of the instant transaction) (520). In response to the payment amount being selected/entered and the transfer being confirmed from the funding source a message is populated on app 151 requesting that the transaction be tried again (535).

Figure 6:
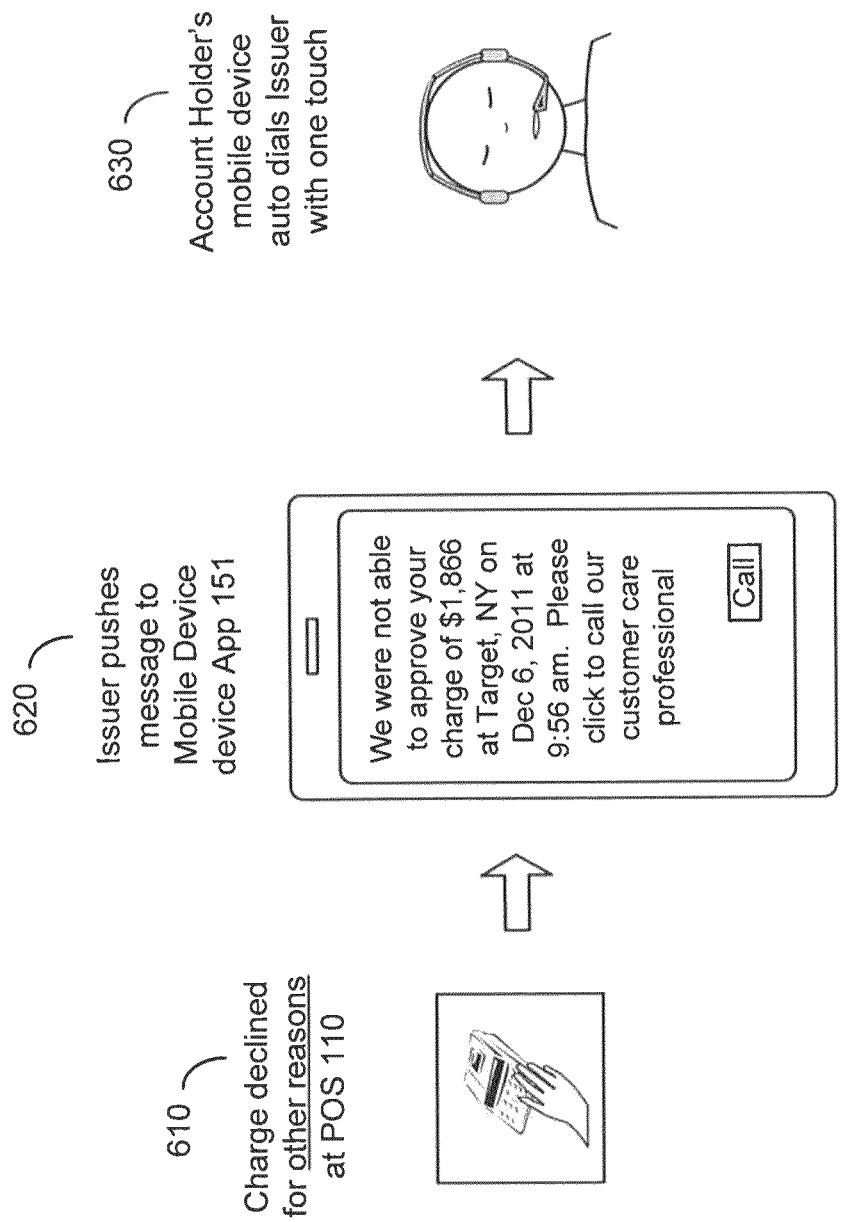
FIG. 6 is a flow chart depicting a point of sale decline resolve tool in accordance with various embodiments.

With reference to FIG. 6, a POS 110 transaction is declined for any reason (610). These reasons may include, suspected fraud, confirmed fraud, past due account, over limit account, those subject to a credit concern, geographic irregularities, cancelled account, out-of-pattern spending, value of transaction, velocity of transactions and/or the like. In response to the transaction being declined, the transaction issuer pushes a message to app 151 with specific information describing the transaction (620). The message may further comprise a virtual "button" for selection by app 151 user to contact a customer care professional. In response to selection of the button, the app 151 user (transaction account holder) is connected with the customer care professional (630). The issuer system may verify the device ID to help streamline the authorization process between the app 151 user and the customer care professional. The customer care professional may describe the reason given for the transaction being declined and offer solutions to cure the issue. In this embodiment, the transaction account holder need only select one virtual button to be placed in contact with support via the mobile device.

Figure 7:
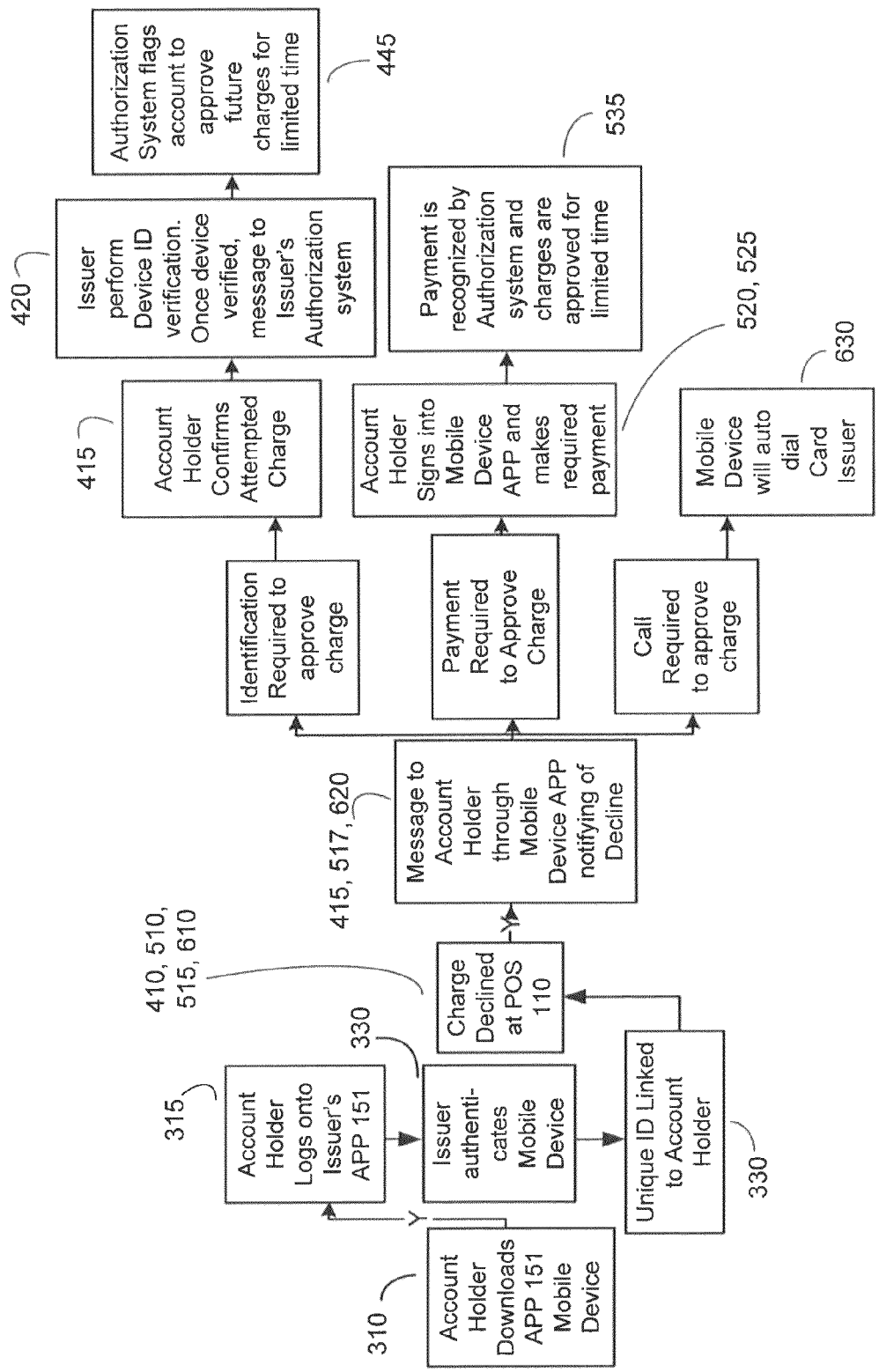
FIG. 7 is a flow chart depicting a point of sale decline resolve tool in accordance with various embodiments.

With reference to FIG. 7, a high level of the present system is depicted. In various embodiments, the transaction account holder downloads and/or installs app 151 (310). The transaction account holder (app 151 user) securely logs on to app 151 (315). The issuer authenticates the user and the mobile device (320). A unique ID is associated with the mobile device (330). At some point, after this process is complete, the transaction account holder provides their transaction account code to a merchant to facilitate a transaction. This transaction may be declined (410, 510, 515, 610). Substantially simultaneously (or any other time period) with the merchant receiving an indication that the transaction is declined, a message associated with the decline is pushed to the mobile device of the transaction account holder (415, 517, 620). This message may indicate that user approval of the charge is required, a payment is needed on the account or a call to customer service should be made to remediate and/or cure the concern associated with the transaction account. For instance, a user may confirm the charge (415), the user may make a payment via app 151 (520, 525), or the user may initiate a call to customer service with one touch (630). Upon receipt of the return message from the user, the information provided may be verified, (e.g. user authorization instructions, device ID, payment information verified and receipt confirmed and/or a customer service representative and/or automated system may be contacted) (420, 535). The transaction processor may be instructed to authorize transactions of a particular amount and/or for a limited duration in response to receiving the message and/or payment data from the user via app 151. The transaction may be approved and/or instructions for the user to attempt the transaction a second time may be communicated to the merchant and/or app 151 user (445).

In various embodiments, multiple transaction accounts may be associated with the app 151 user. Similarly, multiple mobile devices of the transaction account holder may be associated with app 151. In various embodiments, app 151 may facilitate linking a payment source and/or an additional payment source. Data may be transmitted to and from the mobile device via Wifi, mobile network provider, GSM (Global System for Mobile Communications, CDMA (Code division multiple access), satellite, and/or wireless broadband data network, and/or a combination thereof. In various embodiments, the user does not need to securely log into app 151 to reply to a message or initiate a communication session with the issuer and/or customer care representative. In various embodiments, a merchant need not be involved in curing the decline transaction more that initially receiving the transaction account information two times. In some embodiments, the merchant may relay to the transaction account holder that the transaction is declined.

In various embodiments, it is contemplated that a user may initiate the transaction via the mobile device through a merchant's virtual POS 110 and in the instance of a decline, use the same mobile device and app 151 to cure the declined transaction. In various embodiments, a user may initiate the transaction via a merchant's virtual POS 110 and in the instance of a decline, use a mobile device and app 151 to cure the declined transaction.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, Windows 8, OS2, UNIX, Linux, Solaris, MacOS, etc.) as well as various conventional support software and drivers typically associated with computers. A user may include any individual, business, entity, government organization, software and/or hardware that interact with a system.

A user may facilitate transactions via a web client. A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/groups/SNS/cloud-computing/cloud-def-v15.doc (last visited Feb. 4, 2011), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases and terms similar to an "item" may include any good, service, information, experience, data, content, access, rental, lease, contribution, account, credit, debit, benefit, right, reward, points, coupons, credits, monetary equivalent, anything of value, something of minimal or no value, monetary value, non-monetary value and/or the like.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "transaction account holder", "app 151 user", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant may be equipped with a computing device in order to interact with the system and facilitate online commerce transactions. The customer has a computing unit in the form of a personal computer, although other types of computing units may be used including laptops, notebooks, hand held computers, set-top boxes, cellular telephones, tablets, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or various embodiments combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 1-7 the process flows depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in *In Re Nuijten* to fall outside the scope of patentable subject matter under 35 U.S.C. §101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in various embodiments, B alone may be present in various embodiments, C alone may be present in various embodiments, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to an "entity" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, ewallet, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352. Near Field Communication Interface and Protocol-2 (NFCIP-2); and EMV 4.2.

The account number may be distributed and stored in any form of plastic, electronic, magnetic, radio frequency, wireless, audio and/or optical device capable of transmitting or downloading data from itself to a second device. A consumer account number/code may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, transaction account codes, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions for merchant banks. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction. Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to a "card" may include a transaction instrument such as a charge card, credit card, debit card, ewallet, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer.

Phrases similar to a transaction account holder/cardmember may include an entity, typically an individual person or corporation, that has been issued a transaction account or is authorized to use a card.

Phrases similar to "issuer" may include a bank or other financial institution typically operating under regulations of a card issuing association or entity and which issues cards to cardmembers under a cardmember agreement for a cardmember account.

What is claimed is:

1. A method comprising:
   receiving, by a computer based system configured for processing a transaction, a first attempt of a transaction request from a merchant point of sale system;
   declining, by the computer based system, the first attempt of the transaction request;
   transmitting, by the computer based system, a first passively pushed message to an application associated with a transaction account holder, in response to and substantially in concert with the declined first attempt of the transaction request;
   receiving, by the computer based system, a response to the first passively pushed message;
   storing, by the computer based system, a preauthorization of a second attempt of the transaction request in response to the response to the first passively pushed message meeting pre-established criteria;
   transmitting, by the computer based system, a second passively pushed message to the application associated with the transaction account holder;
   receiving, by the computer based system, the second attempt of the transaction request from the merchant point of sale system; and
   authorizing, by the computer based system, the second attempt of the transaction request.

2. The method of claim 1, wherein the first passively pushed message is transmitted to a mobile device of the transaction account holder.

3. The method of claim 2, further comprising receiving, by the computer based system, device characteristics of the mobile device associated with the transaction account holder via the received reply.

4. The method of claim 1, wherein the transaction account holder downloads the application.

5. The method of claim 1, wherein the transaction account holder installs the application on a mobile device.

6. The method of claim 1, wherein the transaction account holder logs onto the application by a mobile device.

7. The method of claim 6, wherein a unique device identifier is associated with the mobile device of the transaction account holder based on a digital fingerprint of the mobile device.

8. The method of claim 1, wherein the transaction is authorized based on both the response to the passively pushed message indicating that the transaction is authorized and a digital fingerprint of the responding device matching a stored digital fingerprint of a mobile device associated with the transaction account holder.

9. The method of claim 1, wherein the first passively pushed message is received by a mobile device.

10. The method of claim 1, wherein the point of sale system is a virtual point of sale system.

11. The method of claim 1, wherein the first passively pushed message comprises one of requesting authorization of a suspected fraudulent transaction, requesting payment on the transaction account, or the option to initiate a one click communication session.

12. The method of claim 11, wherein the payment is requested on the transaction account due to the transaction account being past due or the transaction resulting in the transaction account exceeding a preset limit.

13. The method of claim 1, further comprising receiving secure log-on data via the application.

14. The method of claim 1, wherein the transaction is initiated via a mobile device of the transaction account holder.

15. The method of claim 1, wherein the transaction is authorized based on the transaction account holder submitting a valid payment via the application in response to the passive pushed message.

16. The method of claim 15, wherein the transaction account holder transmits secure log-on information to at least one of receive financial transaction account information or make a payment to the transaction account.

17. The method of claim 1, wherein the first passively pushed message comprises a calculated minimum amount value particular to the instant transaction to cure the declined transaction.

18. The method of claim 1, wherein the second passively pushed message instructs the transaction account holder to perform a second attempt of the transaction.

19. A system comprising:
a processor configured for processing a transaction,
a tangible, non-transitory memory configured to communicate with the processor,
the tangible, non-transitory memory having instructions stored thereon that, in response to execution by the processor, cause the processor to perform operations comprising:
receiving, by the processor, a first attempt of a transaction request from a merchant point of sale system;
declining, by the processor, the first attempt of the transaction request;
transmitting, by the processor, a first passively pushed message to an application associated with a transaction account holder, in response to and substantially in concert with the declined first attempt of the transaction request;
receiving, by the processor, a response to the first passively pushed message;
storing, by the processor, a preauthorization of a second attempt of the transaction request in response to the response to the first passively pushed message meeting pre-established criteria;
transmitting, by the processor, a second passively pushed message to the application associated with the transaction account holder;
receiving, by the processor, the second attempt of the transaction request transaction request from the merchant point of sale system; and
authorizing, by the processor, the second attempt of the transaction request.

20. An article of manufacture including a non-transitory, tangible computer readable storage medium having instructions stored thereon that, in response to execution by a computer-based system configured for processing a transaction, cause the computer-based system to perform operations comprising:
receiving, by the computer based system, a first attempt of a transaction request from a merchant point of sale system;
declining, by the computer based system, the first attempt of the transaction request;
transmitting, by the computer based system, a first passively pushed message to an application associated with a transaction account holder, in response to and substantially in concert with the declined first attempt of the transaction request;
receiving, by the computer based system, a response to the first passively pushed message;
storing, by the computer based system, a preauthorization of a second attempt of the transaction request in response to the response to the first passively pushed message meeting pre-established criteria;
transmitting, by the computer based system, a second passively pushed message to the application associated with the transaction account holder;
receiving, by the computer based system, the second attempt of the transaction request from the merchant point of sale system; and
authorizing, by the computer based system, the second attempt of the transaction request.

* * * * *